(12) United States Patent
Song et al.

(10) Patent No.: US 12,108,155 B2
(45) Date of Patent: Oct. 1, 2024

(54) ZOOM LENS ASSEMBLY SOUNDLESS IN OPERATION, CAMERA MODULE HAVING ZOOM LENS ASSEMBLY, AND ELECTRONIC DEVICE HAVING CAMERA MODULE

(71) Applicant: TRIPLE WIN TECHNOLOGY(SHENZHEN) CO.LTD., Shenzhen (CN)

(72) Inventors: Jian-Chao Song, Guangdong (CN); Ding-Nan Huang, New Taipei (TW); Shin-Wen Chen, New Taipei (TW); Kun Li, Guangdong (CN)

(73) Assignee: TRIPLE WIN TECHNOLOGY (SHENZHEN) CO.LTD., Shenzhen (CN)

( * ) Notice: Subject to any disclaimer, the term of this patent is extended or adjusted under 35 U.S.C. 154(b) by 137 days.

(21) Appl. No.: 17/897,577

(22) Filed: Aug. 29, 2022

(65) Prior Publication Data

US 2023/0388634 A1     Nov. 30, 2023

(30) Foreign Application Priority Data

May 26, 2022    (CN) .......................... 202210590427.6

(51) Int. Cl.
    *H04N 23/69*    (2023.01)
    *G02B 7/09*     (2021.01)
    *H04N 23/55*    (2023.01)

(52) U.S. Cl.
    CPC ............... *H04N 23/69* (2023.01); *G02B 7/09* (2013.01); *H04N 23/55* (2023.01)

(58) Field of Classification Search
    CPC ........ H04N 23/55; H04N 23/57; H04N 23/69; G02B 7/09
    See application file for complete search history.

(56) References Cited

U.S. PATENT DOCUMENTS 8,599,490 B2 * 12/2013 Lee .......................... G02B 3/14
                                                      359/666
2010/0118413 A1 * 5/2010 Kim ..................... G02B 26/004
                                                      359/666

(Continued)

FOREIGN PATENT DOCUMENTS

| CN | 102436018 A | 5/2012 |
| CN | 110109243 A | 8/2019 |
| EP | 2693264 B1 | 1/2020 |

OTHER PUBLICATIONS

Chen et al., "Electrically Tunable Lenses: a Review", Jun. 9, 2021, Frontiers in Robotics and AI. (Year: 2021).*

*Primary Examiner* — Lin Ye
*Assistant Examiner* — Chriss S Yoder, III
(74) *Attorney, Agent, or Firm* — ScienBiziP, P.C.

(57) ABSTRACT

A zoom lens assembly for periscope use which is effectively soundless in operation includes a lens barrel defined with a through hole, a plurality of optical lenses disposed within the through hole, and a focusing member disposed between any two of the plurality of optical lenses. The focusing member in a camera module includes a bottom plate, a cover plate, a piezoelectric element, and a variable transparent body. The variable transparent body is between the bottom plate and the cover plate, the piezoelectric element is disposed on a surface of the cover plate that faces away from the variable transparent body. Electricity fed to the piezoelectric element causes movement of the element which deforms the variable transparent body and changes the focal length of the camera module.

17 Claims, 7 Drawing Sheets

(56) References Cited

U.S. PATENT DOCUMENTS

| | | | |
|---|---|---|---|
| 2011/0164330 A1* | 7/2011 | Henriksen | G02B 3/12 |
| | | | 359/820 |
| 2017/0178946 A1* | 6/2017 | Zenou | H01L 21/4867 |
| 2020/0249466 A1* | 8/2020 | Kartashov | G02B 26/0858 |
| 2020/0319439 A1* | 10/2020 | Byon | G02B 7/09 |
| 2021/0044731 A1* | 2/2021 | Song | G02B 7/02 |

* cited by examiner

ZOOM LENS ASSEMBLY SOUNDLESS IN OPERATION, CAMERA MODULE HAVING ZOOM LENS ASSEMBLY, AND ELECTRONIC DEVICE HAVING CAMERA MODULE

FIELD

The subject matter herein generally relates to image capturing, and more particularly, to a zoom lens assembly soundless in operation, a camera module having the zoom lens assembly, and an electronic device having the camera module.

BACKGROUND

A camera module with auto-focusing function may include a prime lens and a voice coil motor. The voice coil motor drives the prime lens to move, thereby changing a position of the prime lens with respect to an image sensor. However, movements of the prime lens cause noise which is undesirable, for example, when photographing wildlife or in a security situation where any noise may activate a sensor.

BRIEF DESCRIPTION OF THE DRAWINGS

Implementations of the present technology will now be described, by way of example only, with reference to the attached figures.

DETAILED DESCRIPTION

Figure 1:
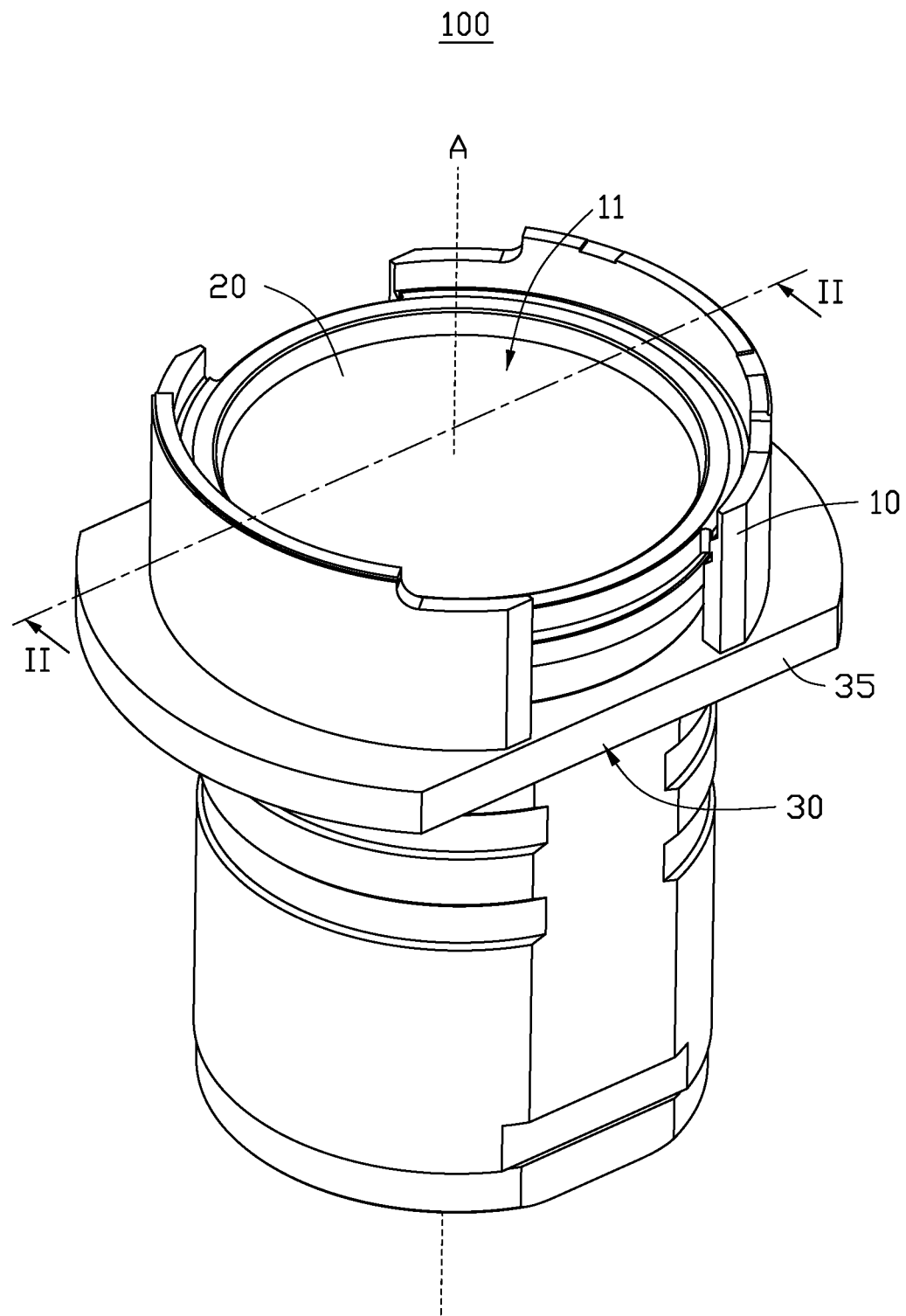
FIG. 1 is a diagrammatic view of a zoom lens assembly according to an embodiment of the present disclosure.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
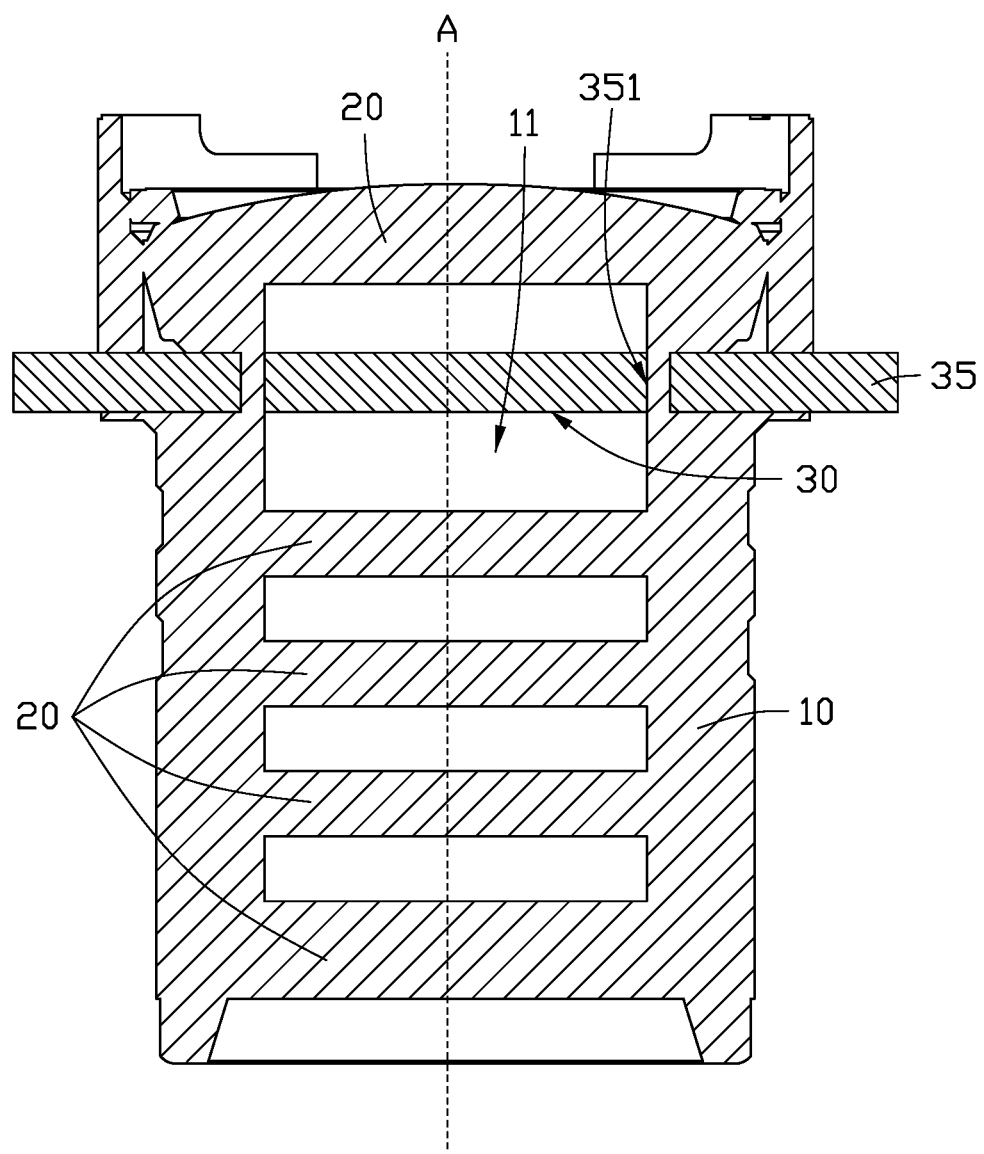
FIG. 2 is a cross-sectional view along line II-II of FIG. 1.

Referring to FIGS. 1 and 2, an embodiment of a zoom lens assembly 100 entirely silent in operation is provided. The zoom lens assembly 100 includes a lens barrel 10, a plurality of optical lenses 20, and a focusing member 30.

The lens barrel 10 is cylindrical. The lens barrel 10 defines a through hole 11. The through hole 11 has a central axis A. The optical lenses 20 are arranged in the through hole 11 along the central axis A. The focusing member 30 is disposed between two adjacent optical lenses 20.

Figure 3A:
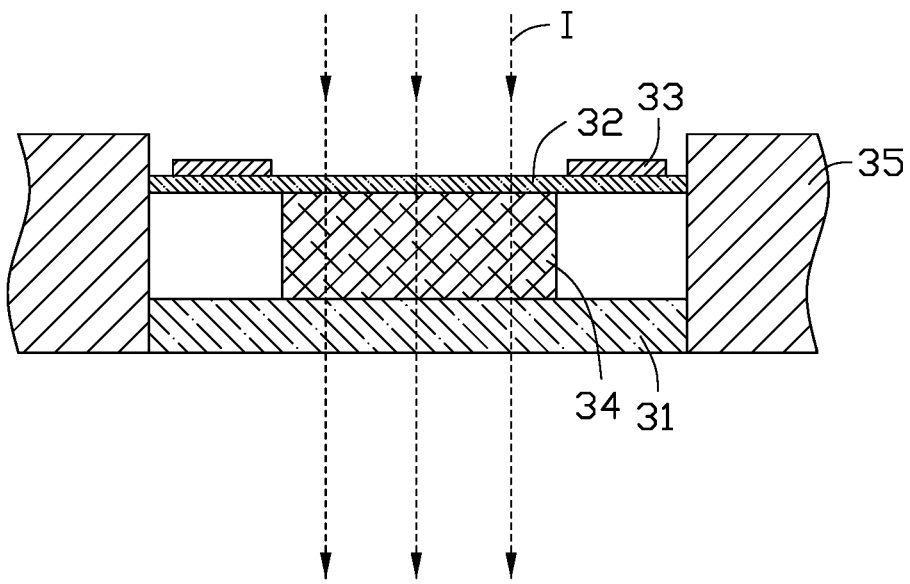
FIG. 3A is a focusing member of the zoom lens assembly of FIG. 1.
Figure 3B:
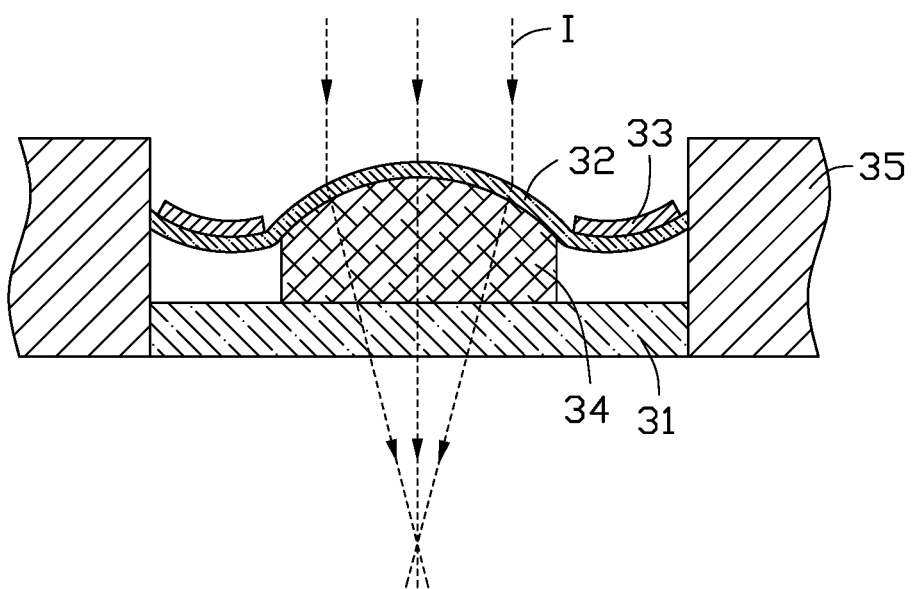
FIG. 3B is similar to FIG. 3A, but showing the focusing member in another state.

Referring to FIGS. 3A and 3B, the focusing member 30 has piezoelectric properties. The focusing member 30 includes a bottom plate 31, a cover plate 32, a piezoelectric element 33, and a variable transparent body 34. The variable transparent body 34 is disposed between the bottom plate 31 and the cover plate 32. The piezoelectric element 33 is disposed on a surface of the cover plate 32 opposite to the variable transparent body 34. The piezoelectric element 33 is staggered from the variable transparent body 34, so that when an electric voltage is applied to the piezoelectric element 33, an end of variable transparent body 34 will start to deform firstly, making the focusing member 30 to become a convex lens. Thereby, changing the focal length of the focusing member 30. In at least one embodiment, the piezoelectric element 33 is made of Lead Zirconate Titanate (chemical formula of $Pb[Zr_xTi_{1-x}]O_3$, wherein $0 \le x \le 1$). The Lead Zirconate Titanate changes its shape when the electric voltage is applied thereto. The variable transparent body 34 is made of polydimethylsiloxane (PDMS). The bottom plate 31 and the cover plate 32 are glass membranes. The thickness of the bottom plate 31 is greater than the thickness of the cover plate 32, so that the bottom plate 31 can support the variable transparent body 34 and the cover plate 32.

The cover plate 32 is flat in its original state. When incoming light beams "I" travel through the cover plate 32, the variable transparent body 34, and the bottom plate 32, the direction of light beams "I" is not changed. The charged piezoelectric element 33 applying mechanical force to the cover plate 32 causes the cover plate 32 to become curved, which deforms the variable transparent body 34. Thereby, the direction of light beams "I" travelling through the cover plate 32, the variable transparent body 34, and the bottom plate 32, is changed, thereby changing a focal length of the zoom lens assembly 100.

With the above configuration, auto-focusing can be achieved by the piezoelectric element 33 in applying mechanical force on the variable transparent body 34. The auto-focusing process is thus to all intents and purposes silent in operation. Meanwhile, because the focusing member 30 is embedded inside the lens barrel 10, the integrity of the zoom lens assembly 100 is improved, which is beneficial for miniaturization of the zoom lens assembly 100.

Referring to FIG. 2, in this embodiment, there are five optical lenses 20, four of these being disposed on one side of the focusing member 30, and the remaining optical lens 20 is disposed on opposite side of the focusing member 30.

Referring to FIGS. 1 and 2, in this embodiment, the focusing member 30 further includes a conductive plate 35. The conductive plate 35 defines an aperture 351. A portion of the conductive plate 35 is embedded in the lens barrel 10, and another portion of the conductive plate 35 protrudes from the lens barrel 10. The portion of the conductive plate 35 embedded in the lens barrel 10 defines the aperture 351. The piezoelectric element 33 is electrically connected to the conductive plate 35. The bottom plate 31, the cover plate 32, and the variable transparent body 34 are disposed within the aperture 351. An edge of the bottom plate 31, an edge of the cover plate 32, and an edge of the variable transparent body 34 resist against an inner wall of the aperture 351.

In at least one embodiment, the conductive plate 35 is made of metal. The lens barrel 10 is made of plastic. The conductive plate 35 and the lens barrel 10 are integrally formed.

Figure 4:
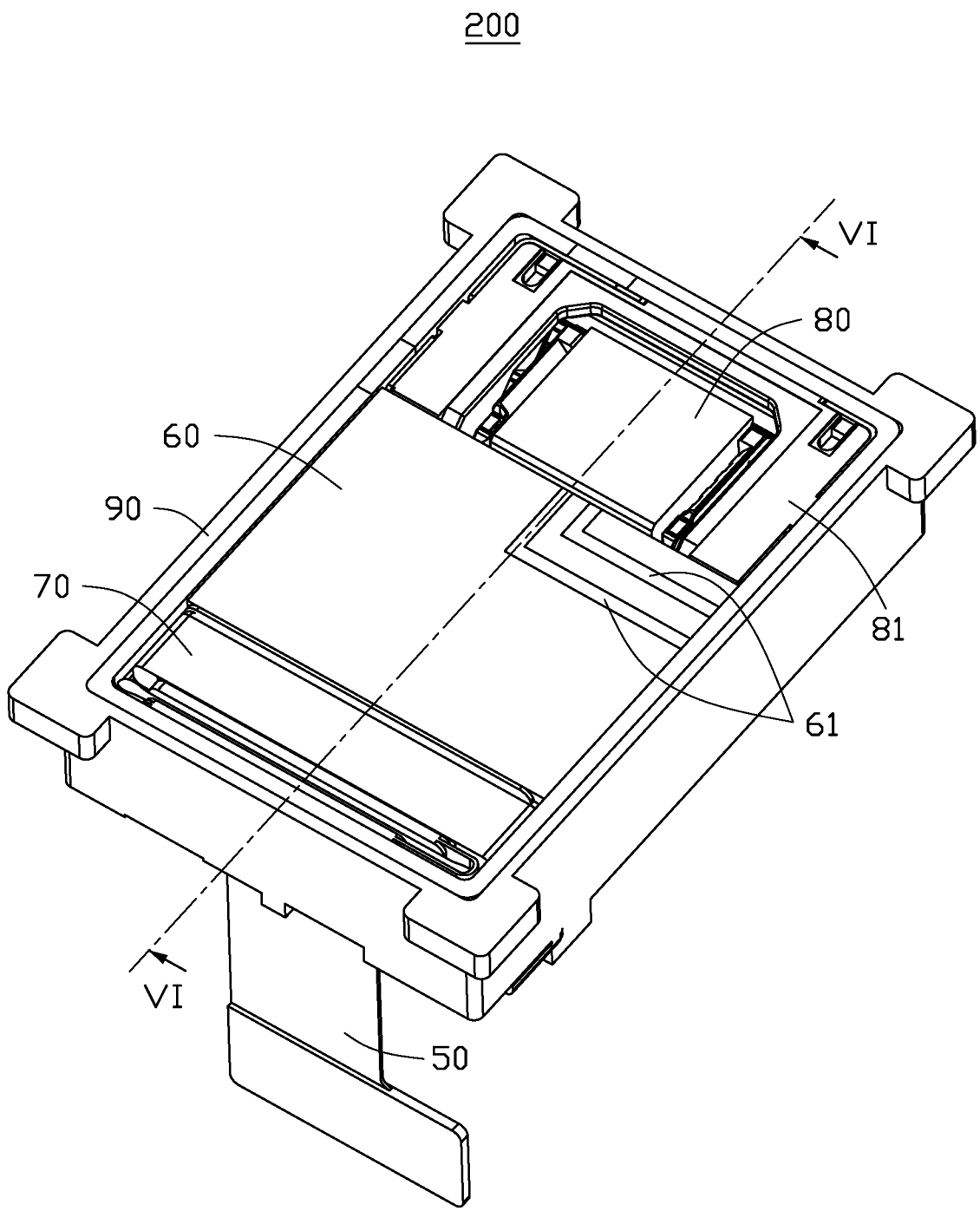
FIG. 4 is a diagrammatic view of a camera module with the zoom lens assembly of FIG. 1 according to an embodiment of the present disclosure.

Referring to FIG. 4, an embodiment of a camera module 200 is provided. The camera module 200 includes a sensor 40, a circuit board 50, and the zoom lens assembly 100. The sensor 40 is connected to the circuit board 50. The sensor 40 faces the through hole 11. The sensor 40 may be a charge coupled device (CCD) or a complementary metal-oxide semiconductor (CMOS). The circuit board 50 may be a rigid board, a flexible board, or a rigid-flex board. The conductive plate 35 is connected to the circuit board 50.

Figure 5:
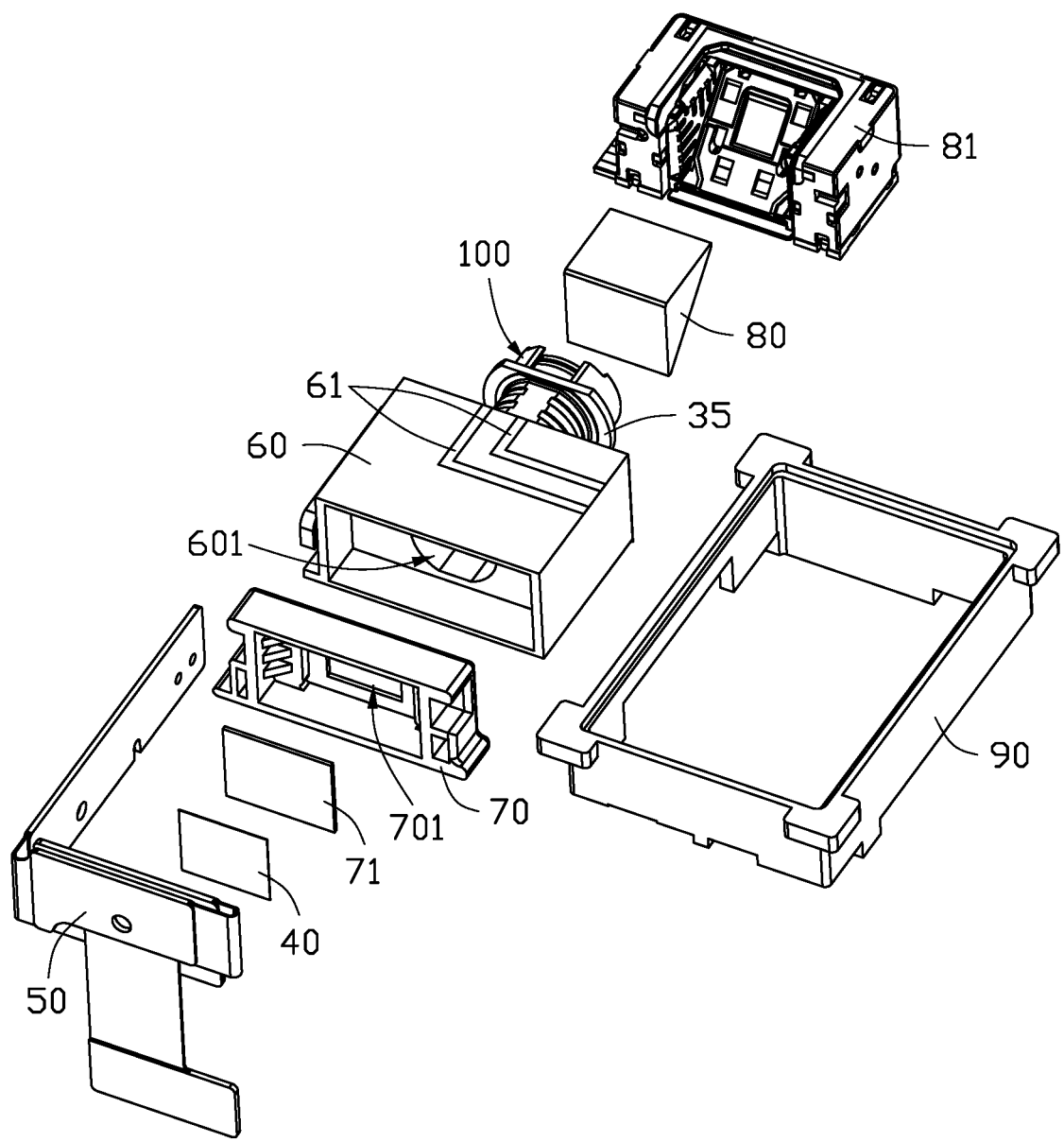
FIG. 5 is an exploded view of the camera module of FIG. 4.
Figure 6:
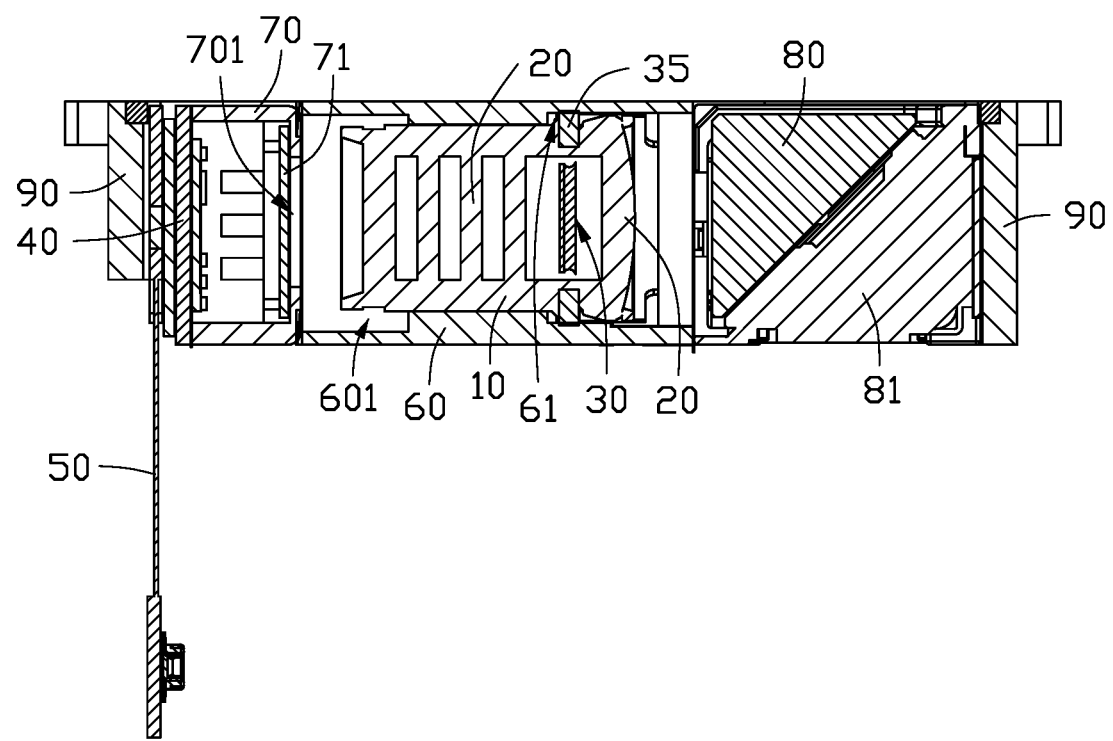
FIG. 6 is a cross-sectional view along line V-V of FIG. 4.

Referring to FIGS. 5 and 6, in this embodiment, the camera module 200 further includes a sleeve 60 and a conductive wiring 61. The sleeve 60 defines a first receiving hole 601. The zoom lens assembly 100 is disposed within the first receiving hole 601. First end of each of the conductive wiring 61 is connected to the inner wall of the first receiving hole 601 and electrically connected to the conductive plate 35. Second end of each of the conductive wiring 61 is connected to the outer wall of the first receiving hole 601 and electrically connected to the circuit board 50. In this embodiment, the sleeve 60 and the conductive wiring 61 are formed by Direct Laser Sintering (DLS).

Referring to FIGS. 5 and 6, in this embodiment, the camera module 200 further includes a base 70 and an optical filter 71. The base 70 defines a second receiving hole 701. The optical filter 71 is disposed with the second receiving hole 701. The base 70 is configured between the circuit board 50 and the sleeve 60, the second receiving hole 701 faces the first receiving hole 601, the optical filter 71 faces the sensor 40 and the zoom lens assembly 100. The optical filter 71 may be an infrared cutout filter.

Referring to FIGS. 5 and 6, in this embodiment, the camera module 200 further includes a reflecting member 80 and an actuator 81. The reflecting member 80 is disposed on an end of the sleeve 60 opposites to the base 70. The actuator 81 is mechanically connected to the reflecting member 80. The actuator 81 is used for adjusting direction of the light passing through the reflecting member 80, so that the light can be parallel to the central axis A. In this embodiment, the reflecting member 80 may be a prism or a mirror. The actuator 81 can be a voice coil motor. Thereby, making the camera module 200 to be a periscope-type zoom camera module.

Referring to FIGS. 5 and 6, in this embodiment, the camera module 200 further includes an outer frame 90. The reflecting member 80, the actuator 81, the circuit board 50, the sleeve 60, and the zoom lens assembly 100 are disposed within the outer frame 90.

Figure 7:
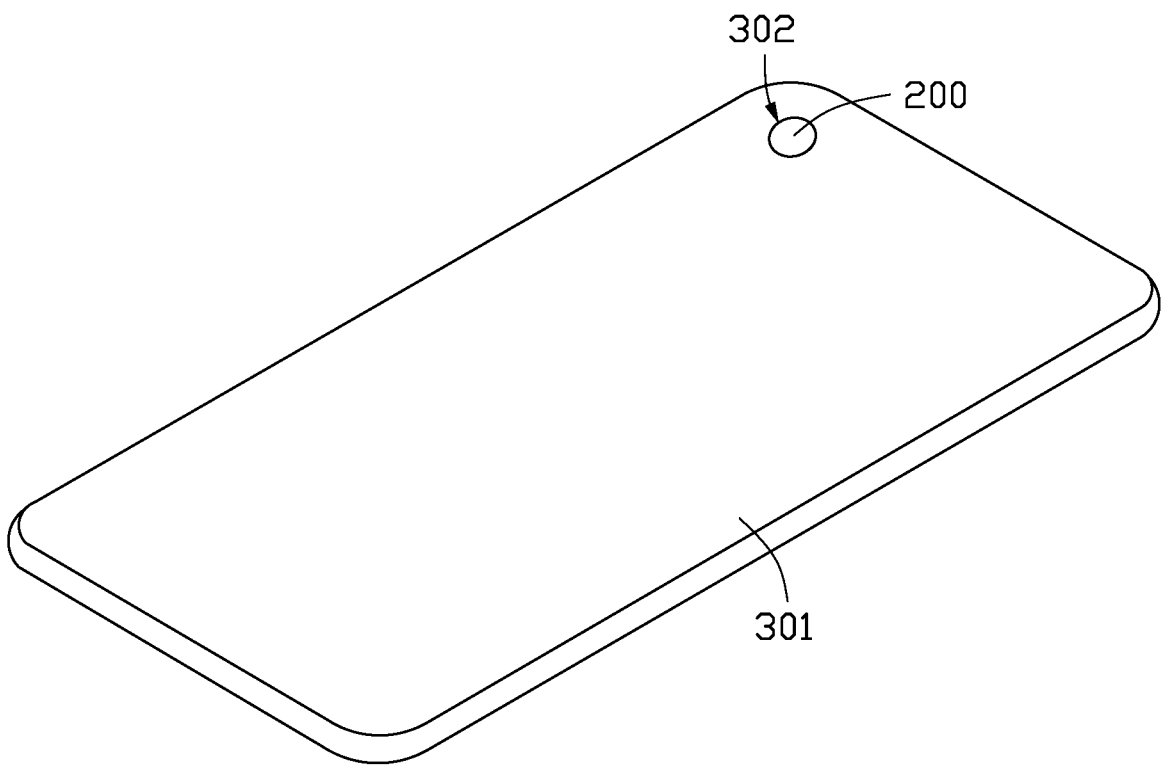
FIG. 7 is a diagrammatic view of an electronic device according to an embodiment of the present disclosure

Referring to FIG. 7, an embodiment of an electronic device 300 is provided. The electronic device 300 includes a casing 301 and the camera module 200 disposed within the casing. The casing 301 defines an opening 302. A portion of the camera module 200 is exposed from the opening 302. Particularly, the electronic device 300 may be a cell phone, a notebook, a smartphone, an IPAD, or any other equipment with imaging function.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A zoom lens assembly comprising:
   a lens barrel defining a through hole;
   a plurality of optical lenses disposed in the through hole; and
   a focusing member disposed between adjacent two of the plurality of optical lenses;
   wherein the focusing member comprises a bottom plate, a cover plate, a piezoelectric element, a variable transparent body, and a conductive plate, the variable transparent body is disposed between the bottom plate and the cover plate, the piezoelectric element is disposed on a surface of the cover plate facing away from the variable transparent body, the piezoelectric element is staggered from the variable transparent body, so that when an electric voltage is applied to the piezoelectric element, an end of variable transparent body start to deform firstly, the conductive plate is connected to the piezoelectric element, the conductive plate defines an aperture, the bottom plate, the cover plate, and the variable transparent body are disposed in the aperture, the conductive plate and the lens barrel are integrally formed.

2. The zoom lens assembly of claim 1, wherein the conductive plate is partially embedded in the lens barrel.

3. The zoom lens assembly of claim 1, wherein the piezoelectric element is made of Lead Zirconate Titanate, and the variable transparent body is made of polydimethylsiloxane.

4. A camera module comprising:
   a sensor;
   a circuit board connected to the sensor; and
   a zoom lens assembly facing the sensor, the zoom lens assembly comprising:
      a lens barrel defining a through hole;
      a plurality of optical lenses disposed in the through hole; and
      a focusing member disposed between adjacent two of the plurality of optical lenses;
   wherein the focusing member comprises a bottom plate, a cover plate, a piezoelectric element, a variable transparent body, and a conductive plate, the variable transparent body is disposed between the bottom plate and the cover plate, the piezoelectric element is disposed on a surface of the cover plate facing away from the variable transparent body, the piezoelectric element is staggered from the variable transparent body, so that when an electric voltage is applied to the piezoelectric element, an end of variable transparent body start to deform firstly, the conductive plate is connected to the piezoelectric element, the conductive plate defines an aperture, the bottom plate, the cover plate, and the variable transparent body are disposed in the aperture, the conductive plate and the lens barrel are integrally formed.

5. The camera module of claim 4, further comprising a sleeve and a conductive wiring, wherein the sleeve defines a first receiving hole, a first end of the conductive wiring is disposed in the first receiving hole, and a second end of the conductive wiring is disposed outside the first receiving hole, the conductive plate is disposed within the first receiving hole and connected to the first end of the conductive wiring, and the circuit board is connected to the second end of the conductive wiring.

6. The camera module of claim 5, wherein the conductive wiring is formed on an inner surface or an outer surface of the sleeve by Direct Laser Sintering.

7. The camera module of claim 5, further comprising a base and an optical filter, wherein the base defines a second receiving hole, the optical filter is disposed in the second receiving hole facing the first receiving hole, and the base is arranged between the circuit board and the sleeve.

8. The camera module of claim 5, further comprising a reflecting member and an actuator, wherein the reflecting member is disposed on a side of the sleeve faces away from the circuit board, the actuator is connected to the reflecting member, and the actuator is configured to drive the reflecting member to move.

9. The camera module of claim 4, wherein the conductive plate is partially embedded in the lens barrel.

10. The camera module of claim 4, wherein the piezoelectric element is made of Lead Zirconate Titanate, and the variable transparent body is made of polydimethylsiloxane.

11. An electronic device comprising a camera module, the camera module comprising:
a sensor;
a circuit board connected to the sensor; and
a zoom lens assembly facing the sensor, the zoom lens assembly comprising:
a lens barrel defining a through hole;
a plurality of optical lenses disposed in the through hole; and
a focusing member disposed between adjacent two of the plurality of optical lenses;
wherein the focusing member comprises a bottom plate, a cover plate, a piezoelectric element, a variable transparent body, and a conductive plate, the variable transparent body is disposed between the bottom plate and the cover plate, the piezoelectric element is disposed on a surface of the cover plate facing away from the variable transparent body, the piezoelectric element is staggered from the variable transparent body, so that when an electric voltage is applied to the piezoelectric element, an end of variable transparent body start to deform firstly, the conductive plate is connected to the piezoelectric element, the conductive plate defines an aperture, the bottom plate, the cover plate, and the variable transparent body are disposed in the aperture, the conductive plate and the lens barrel are integrally formed.

12. The electronic device of claim 11, further comprising a sleeve and a conductive wiring, wherein the sleeve defines a first receiving hole, a first end of the conductive wiring is disposed in the first receiving hole, and a second end of the conductive wiring is disposed outside the first receiving hole, the conductive plate is disposed within the first receiving hole and connected to the first end of the conductive wiring, and the circuit board is connected to the second end of the conductive wiring.

13. The electronic device of claim 12, wherein the conductive wiring is formed on an inner surface or an outer surface of the sleeve by Direct Laser Sintering.

14. The electronic device of claim 12, further comprising a base and an optical filter, wherein the base defines a second receiving hole, the optical filter is disposed in the second receiving hole facing the first receiving hole, and the base is arranged between the circuit board and the sleeve.

15. The electronic device of claim 12, further comprising a reflecting member and an actuator, wherein the reflecting member is disposed on a side of the sleeve faces away from the circuit board, the actuator is connected to the reflecting member, and the actuator is configured to drive the reflecting member to move.

16. The electronic device of claim 11, wherein the conductive plate is partially embedded in the lens barrel.

17. The electronic device of claim 11, wherein the piezoelectric element is made of Lead Zirconate Titanate, and the variable transparent body is made of polydimethylsiloxane.

* * * * *